(12) United States Patent
Siegel

(10) Patent No.: US 7,289,970 B1
(45) Date of Patent: Oct. 30, 2007

(54) METHOD TO ELECTRONICALLY TRACK PERSONAL CREDIT INFORMATION

(75) Inventor: Brian Siegel, Washingtonville, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 939 days.

(21) Appl. No.: 09/650,034

(22) Filed: Aug. 29, 2000

Related U.S. Application Data

(60) Provisional application No. 60/210,115, filed on Jun. 7, 2000.

(51) Int. Cl.
*G06Q 40/00* (2006.01)

(52) U.S. Cl. .......................................... 705/39; 705/14

(58) Field of Classification Search .................. 705/39, 705/14
See application file for complete search history.

(56) References Cited

U.S. PATENT DOCUMENTS

| | | | |
|---|---|---|---|
| 6,014,634 A * | 1/2000 | Scroggie et al. | 750/14 |
| 6,092,053 A * | 7/2000 | Boesch et al. | 705/26 |
| 6,101,486 A * | 8/2000 | Roberts et al. | 705/27 |
| 6,119,933 A * | 9/2000 | Wong et al. | 235/380 |
| 6,129,274 A * | 10/2000 | Suzuki | 235/381 |
| 6,243,688 B1 * | 6/2001 | Kalina | 705/14 |
| 6,381,632 B1 * | 4/2002 | Lowell | 709/203 |
| 6,540,135 B1 * | 4/2003 | Berstis | 235/379 |
| 6,606,602 B1 * | 8/2003 | Kolls | 705/14 |
| 2002/0065712 A1 * | 5/2002 | Kawan | 705/14 |
| 2002/0152123 A1 * | 10/2002 | Giordano et al. | 705/14 |

FOREIGN PATENT DOCUMENTS

| | | | |
|---|---|---|---|
| JP | 405081298 A | * | 4/1993 |
| JP | 02000011109 | * | 1/2000 |

* cited by examiner

*Primary Examiner*—Alain L. Bashore
(74) *Attorney, Agent, or Firm*—Miller Patent Sevices; Jerry A. Miller

(57) ABSTRACT

A method and apparatus for tracking transactions made over the Internet. A sidecar application detects entry of a credit card number. The application auto-populates a web page associated with the transaction and updates a database that tracks the transaction. Third parties can be given access to the database to process loyalty points or make bill payments.

34 Claims, 6 Drawing Sheets

METHOD TO ELECTRONICALLY TRACK PERSONAL CREDIT INFORMATION

CROSS REFERENCE TO RELATED DOCUMENTS

This application is related to and claims priority of U.S. provisional patent application Ser. No. 60/210,115, filed Jun. 7, 2000 in the name of Brian M. Siegel for "Method to Electronically Identify and Distribute Personal Credit Card information", which is hereby incorporated by reference.

FIELD OF THE INVENTION

This invention relates generally to the field of electronic commerce. More particularly, in one embodiment, this invention relates to a method to electronically track personal credit information accumulated by automatically capturing information from online transactions.

BACKGROUND OF THE INVENTION

Many loyalty point programs require use of a special credit card or presentation of a particular membership number at the time of a transaction in order to credit the customer with loyalty points. It thus becomes difficult for a consumer to fully realize all of the benefits of loyalty point programs. As an example, airline points often can be credited for rental car use, certain purchases and hotel stays. However, in order to obtain credit for these purchases, the user must take special steps at the time of purchase.

In other environments, a particular credit card is required to obtain loyalty points. Generally, such a program is designed to promote brand loyalty among customers. However, the requirement that a particular credit card be used may inhibit some consumers from participating in a particular loyalty program. Most corporations promoting brand loyalty programs are interested in obtaining the consumer's brand loyalty even if the consumer chooses not to use a preferred payment method. However, it is currently difficult to track and maintain a customer's loyalty points if not tied to a particular type of credit card so transactions can be readily monitored. It would be advantageous to provide a method to track online purchases without regard for the type of credit card used for providing benefits under loyalty programs.

In addition to the above, it is noted that Internet commerce is becoming a more convenient source of purchases for many consumers. In the more historically conventional "brick and mortar" world, the consumer makes a purchase at a retail location by tendering cash, check or credit card and is provided with the merchandise on the spot along with purchase documentation. This can be used to track the consumer's purchases manually if desired using any suitable mechanism. However, as consumers become more dependent on the Internet for purchases, it may become more difficult to track purchases when the consumer has multiple outstanding purchases, possibly on multiple outstanding credit cards. In addition, as the consumer visits new web sites to make purchases, he or she is often required to enter the same type of information (shipping address, credit card number, etc.) repeatedly. It would be advantageous to provide a method to simplify as well as easily track and manage online purchases without regard for the type of credit card used or web site visited.

SUMMARY OF THE INVENTION

The present invention relates generally to electronic commerce. Objects, advantages and features of the invention will become apparent to those skilled in the art upon consideration of the following detailed description of the invention.

In one embodiment consistent with the present invention, a method of tracking online credit card usage by a user of an Internet communication device, includes: monitoring entries made on the Internet communication device; detecting instances of a credit card transaction in the entries made on the Internet communication device; and upon detecting an instance of a credit card transaction, storing information describing the credit card transaction in a database accessible by the Internet communication device.

A computer system, consistent with embodiments of the present invention, includes a processor having a central processing unit, an input device and memory. A storage device is coupled to the processor, and stores a database. The processor is programmed to perform the programmed steps of tracking online credit card usage by a user of the computer system comprising the steps of: monitoring entries made by a user using the input device; detecting instances of a credit card transaction in the entries made by the user; and upon detecting an instance of a credit card transaction, storing information describing the credit card transaction in the database.

A method of managing loyalty points, consistent with embodiments of the present invention includes: storing transactions on a computer database; granting access to the computer database to a loyalty point provider; and receiving loyalty points based on the data stored in the computer database.

A method of managing loyalty points, consistent with embodiments of the present invention includes: receiving access to a computer database of transactions made by a user; and granting loyalty points based on the data stored in the computer database.

In another embodiment consistent with the present invention, a storage medium stores a set of computer instructions which, when executed on a computer, carry out a process including: monitoring entries made by a user using an input device; detecting instances of a credit card transaction in the entries made by the user; and upon detecting an instance of a credit card transaction, storing information describing the credit card transaction in a database.

A computer system, according to another exemplary embodiment includes a processor having a central processing unit, an input device and memory. The processor is programmed to perform the programmed steps of: receiving access to a computer database of transactions made by a user; carrying out a query of the computer database to determine purchases that qualify for loyalty points; and granting loyalty points based on the data stored in the computer database.

A storage medium, consistent with an embodiment of the present invention stores a set of computer instructions which, when executed on a computer, carry out a process including obtaining access to a computer database of transactions made by a user; carrying out a query of the computer database to determine purchases that qualify for loyalty points; and granting loyalty points based on the data stored in the computer database.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
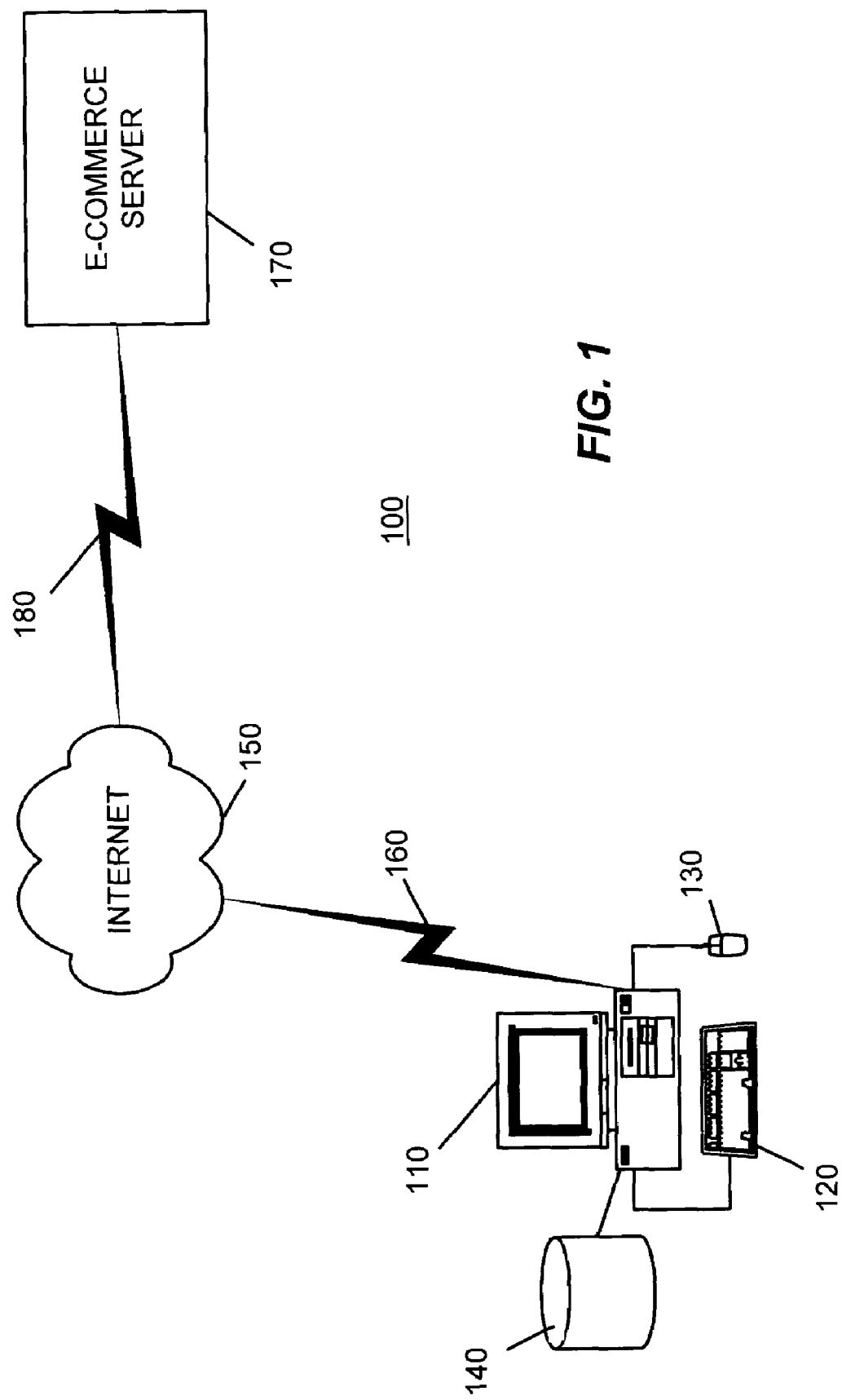
FIG. 1 is a simplified block diagram of a typical electronic commerce system suitable for use in carrying out an embodiment consistent with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a system 100 suitable for carrying out an embodiment of the present invention is illustrated. In this system, a computer such as an IBM compatible personal computer 110 (or other computing device) can be used to carry out a process according to the present invention. In this exemplary embodiment, computer 110 includes a keyboard 120 and possibly a mouse or other pointing device 130. Computer 110 also includes a mass storage device 140 such as a hard disc drive. Mass storage device 140 should be suitable for storing a database in a known manner.

Computer 110 is coupled to the Internet 150 via a communication link 160. Communication link 160 may include any suitable communication link for communication with the Internet. Examples of such communication links include dial-up modem telephone line connections, DSL (Digital Subscriber Line) connections, ISDN (Integrated Services Digital Network) and cable modem connections, to name a few example. An Electronic Commerce Server 170 is also coupled to the Internet 150 via a communication link 180. In accordance with known techniques, a user of the computer 110 can link to E-Commerce Server 170 via the Internet 150 in order to carry out various transactions. For example, a user may wish to carry out a credit card transaction via Internet 150 to E-Commerce Server 170 in order to make a purchase of a book, a compact disc or other goods or services. In so doing, the E-Commerce Server 170 provides for the user of computer 110 to view catalog pages, indexes, etc. in order to identify the merchandise to be purchased.

Once an item to be purchased is identified, the user may, for example, electronically deposit the merchandise in an electronic shopping cart (or other shopping metaphor) to accumulate a list of items to be purchased. When the user of computer 110 is prepared to make a purchase, the E-Commerce Server 170 conventionally transmits a web page, such as an XML enabled web page, to computer 110 in order to gather payment and shipping information from the user. The user can then fill in the form with credit card information, shipping information, etc. in order to consummate the purchase.

In accordance with an embodiment of the present invention, rather than having the user type all of the relevant information to consummate the purchase, computer system 110 recognizes the entry of credit card information from a stored profile provided by the user during setup of a computer program. Thus, the keyboard entries are intercepted by a background application (for example, a so-called sidecar application—not to be confused with the trademarked SIDE-CAR™ computer program) that recognizes that a credit card number is being entered. The technology to implement such an application is well known and need not be repeated here. Upon recognizing that a credit card number is being entered into a web page, the background application determines that an online purchase is to be made. The background application then automatically populates the fields of the web page order form to the extent possible as well as enters information in a database stored in mass storage device 140 with information relating to the transaction. This database can then be utilized for a number of useful database functions by the user of computer system 110. According to one embodiment, the user of computer system 110 can call up the database to determine on a regular basis the amount of purchases made with one or many credit cards registered with the application. In other embodiments, the database can be utilized to grant access to third parties such as creditors and loyalty point providers to permit additional benefits to the user.

Figure 2:
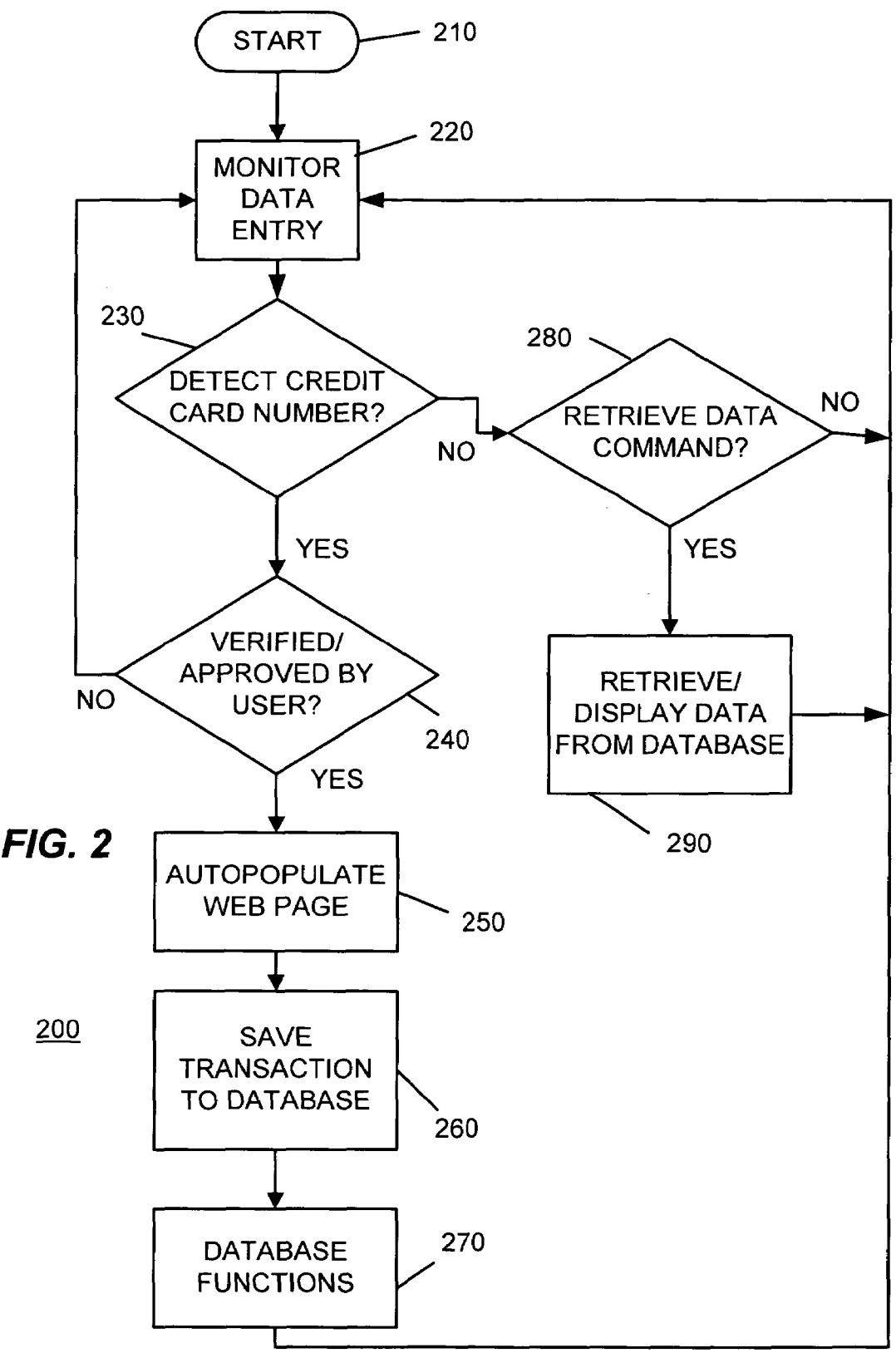
FIG. 2 is a flow chart describing one exemplary embodiment of a process consistent with the present invention.

In order to utilize the background application of the present invention, the user first creates a profile containing various information such as name, address, E-mail address, credit card number, expiration date, etc. which provides the application with the ability to first recognize entry of credit card information and second, automatically populate fields in an electronic order form. Once this information is entered, process 200 as shown in FIG. 2, is carried out. This process starts at 210 where the application is enabled in the background as computer 110 carries on normal operations. At 220, the application monitors data entered by the user and determines upon detection of matching credit card information that an online transaction is being carried out. If a credit card number is detected at 230, the application first asks the user to verify and approve that a transaction is being made and is to be entered into the database stored in 140 at 240. If the user is, for example, simply typing a letter to the credit card company regarding an erroneous bill and as part of that letter is typing the credit card number, the user will wish to disapprove carrying the process 200 any further and control returns to 220 to await the next instance of a credit card number entry. If however, the user is, in fact, filling out an online order form and a credit card number is detected, the user will likely approve or verify continuation of the process at 240. In this case, the web page containing the online order form is automatically populated at 250 with as much information as the application can provide.

Owing to the many variations in field names, full auto population may not be possible without taking special measures to register particular field names associated with particular web sites. For example, there are many variations in even simple name fields such as, for example: name, first name, firstname, customer name, etc. The present invention can search for all obvious variations in such fields in a known manner and make a best effort attempt to auto-populate the web page. Any unfilled fields may be manually entered by the user at 150. After auto-populating the web page and returning it to the E-Commerce Server 170, the transaction is saved to a database stored on mass storage device 140 at 260. The transaction can be entered with as much information as the user may wish to save. For example, the saving of the transaction can include extracting item descriptions, item numbers, prices and other information from the order entry web page. In addition, the database transaction can be time stamped with a time and date of the transaction as well as a user name (in order to provide for multiple users using the same credit card), and a full web address for the order entry page. In other embodiments, the entire web page can be captured to a file which is indexed in the database for future reference.

Once this information is saved to the database, the user can carry out any number of database functions on the information at 270. By way of example, and not by way of limitation, the database functions can include simply viewing the transactions, providing totals of expenditures, totaling loyalty points or any number of database functions. Control then returns to 220 to monitor data input for the next credit card number entry. As data entry is being monitored at 220, control can also pass to 280 when credit card numbers are not detected to monitor for a command at 280 generated by the user to retrieve data from the database stored on 140. If such a command is not received control passes to 220.

If a command to retrieve data is received, the user can enter any number of data retrieval commands to show various displays and reports from the database at 290 before returning to 220. Those skilled in the art will appreciate that the process shown as 200 can be varied in many ways, including modification of the time sequence, without departing from the present invention. For example, database functions 270 can be carried out only when the user desires to retrieve information at 280. The order of various steps may be modified and rearranged in various ways and the auto-population process of 250 can be omitted altogether in certain embodiments. The embodiment described above provides a convenient mechanism for a user to track credit card usage over the Internet. However, a system under the users control that tracks Internet purchases can become an even more powerful tool for the user to maximize convenience in paying bills as well as maximize and open up possibilities for capitalizing on loyalty point programs if the user can provide limited access to the database by certain third parties. In system 100, this can generally be accommodated with an always on Internet connection if communication link 160 provides such a connection. In another embodiment, polling techniques can be utilized by computer system 110 to provide regular access to third parties by polling the third parties sites. In other embodiments, the user of computer system 110 can manually address particular third party sites to take advantage of further features of the present invention.

Figure 3:
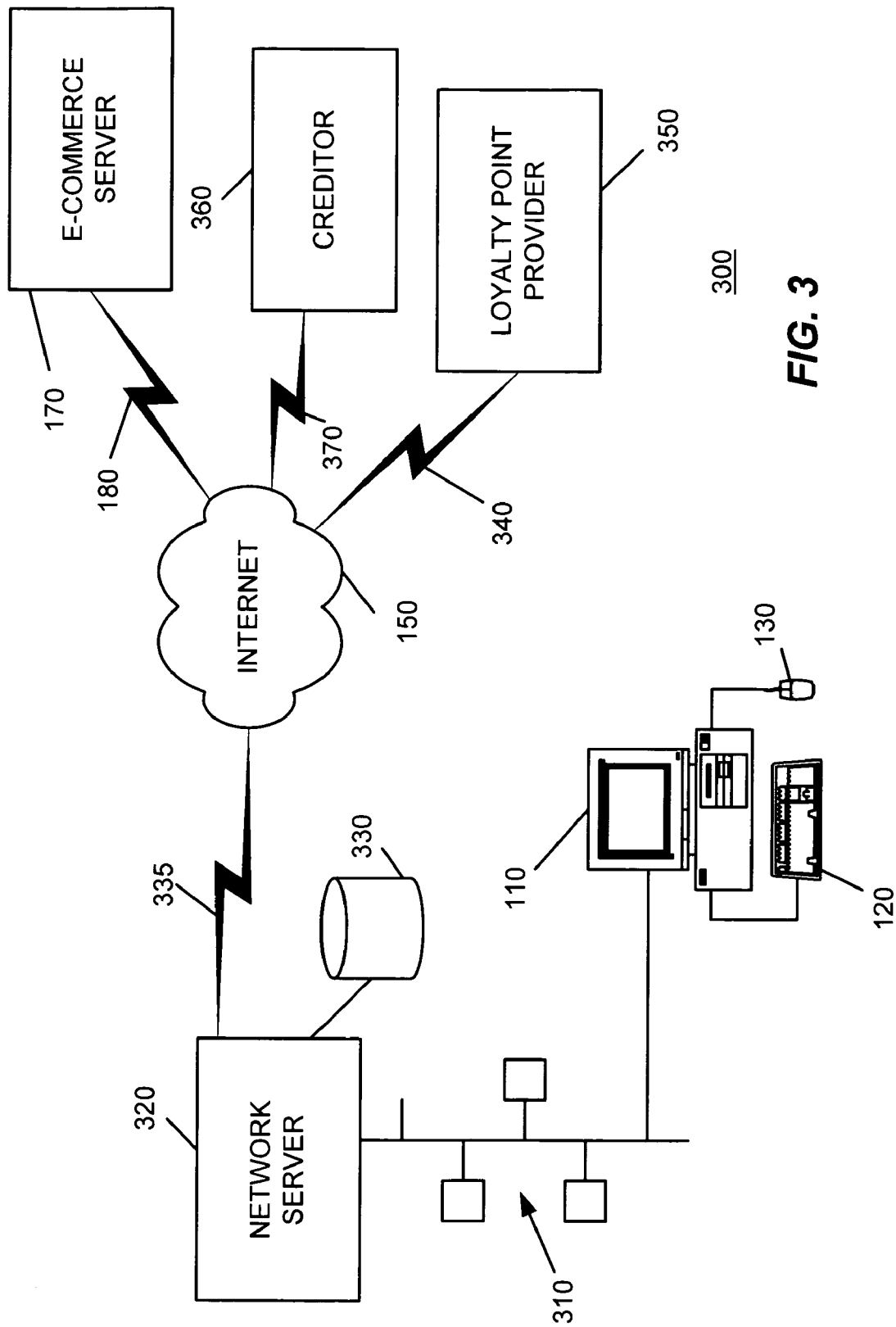
FIG. 3 is a block diagram of an electronic commerce system using a network connection to the Internet suitable for use in carrying out another embodiment consistent with the present invention.

Referring now to FIG. 3, a user can advantageously provide access to the database described herein by connection to a local area network (LAN) 310 having an always on network server 320 with a connection to the Internet and an associated mass storage device 330. In this embodiment, the associated mass storage device 330 can contain the database (or a selected portion of the database as desired by the user) which can not only be populated during Electronic Commerce transactions with various Electronic Commerce servers such as 170 but can also be made selectively available via connection 340 to a loyalty point provider 350 or to a creditor 360 via connection 370.

In this embodiment, shown as 300, the database stored in 330 also includes a profile of the loyalty point provider 350 and creditor 360. The profile defines the parameters under which the user of computer 110 will permit access to the database stored on 330. For example, in the case of creditor 360, which might be, for example, an electric utility company, the user may determine from the profile established for creditor 360 that he will permit the creditor 360 to charge up to $150 per month for payment of his electric bill. For creditors such as an electric company which might have a budget plan establishing a monthly payment, can be utilized to satisfy the creditors charges in full on a monthly basis.

In another embodiment, loyalty points (for example, programs similar to frequent flyer miles, hotel rewards, etc.) can be provided in new ways. Traditionally, credit cards might supply loyalty points based on transactions using a particular credit card. An example of such a program is the Sony Credit Card which provides Sony points which can be used to purchase Sony products and services. In another example, airline miles are routinely credited to an account based upon travel with a particular airline as well as selected hotel accommodations or rental car accommodations and perhaps other purchases provided the user takes appropriate steps at each transaction to consummate the awarding of the loyalty points.

In accordance with the present invention, the loyalty point provider 350 can be provided access to the database on 330 in order to open the database, search for purchases which quality for loyalty points, credit the users account with the loyalty points and then close the connection to the database. This expands the user's ability to readily capitalize upon loyalty points for loyalty programs that might not automatically credit all types of purchases. For example, a manufacturer or reseller may wish to provide points for purchases of particular brands of merchandise, without regard for what particular credit card is used. Thus, if the manufacturer of electronic products wishes to grant rewards for customer loyalty without requiring affiliation of a particular credit card for providing the loyalty points, system 300 can be utilized to give the loyalty point provider the ability to scan the database in 330 to obtain information on purchases which might qualify for the loyalty points. In this manner, the user is not restrained to a particular credit card in order to obtain loyalty points. By purchasing a particular brand of products over the Internet either at designated sites or simply by brand, the user can thus be awarded loyalty points for brand loyalty.

Figure 4:
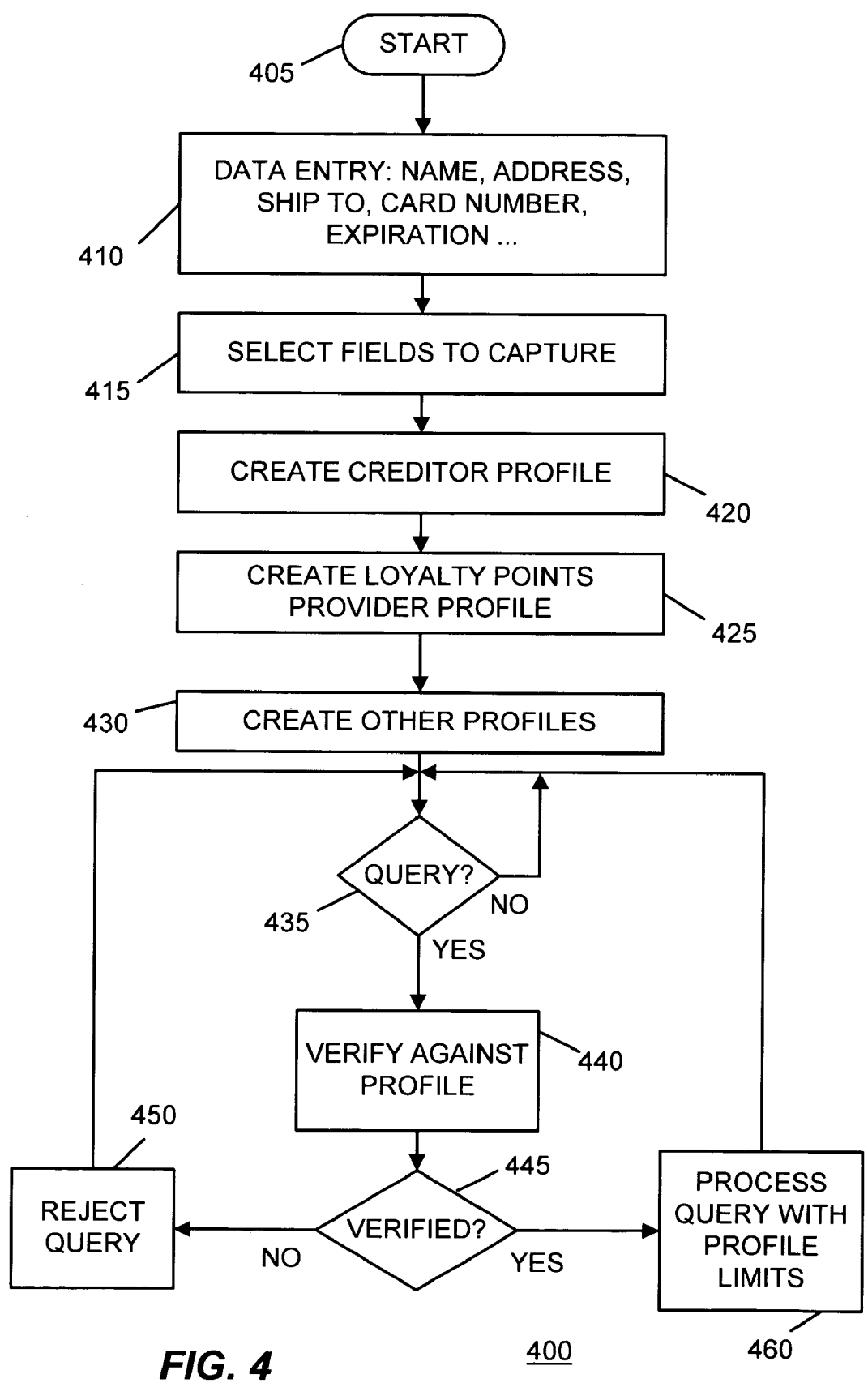
FIG. 4 is a flow chart describing an exemplary embodiment of a process for establishing profiles and processing queries consistent with the present invention.

Operation of one embodiment of the current application is illustrated as process 400 of FIG. 4. This process starts at 405 after which the user enters a data entry phase to enter a name, address, shipping information, credit card number, expiration date and other fields which might be necessary to capture the credit card number and auto populate the web page fields at 410. At 415, the user can select the type of information to be captured from the web site or otherwise surrounding the circumstances of the purchase, for example web page address, date and time stamping, item number, item name or description, purchase price, shipping, tax, etc. In the case of creditors, the user can create a creditor profile at 420 which may include information to assure that the creditor contact with the database involves only a secure transaction. The creditor profile created at 420 may also include various limitations such as maximum number of transactions in one month, maximum dollar amount of transactions in one month, etc.

In accordance with a similar process, the user can create a profile of a loyalty points provider at 425 to provide the necessary information for crediting a loyalty points account with loyalty points. Other types of profiles may be created at 430 to permit others to either use the account (for example, a child at school in a remote location may be given access to the credit card account but the user may wish to track transactions separately. Or, a child may be given a particular allowance in the form of credit card dollars that can be spent online on a monthly basis so that the parent has a mechanism for monitoring the expenditures of a child.)

Once all of the profiles are created, the program is enabled and awaits a query from a remote third party. The term query as used herein can include an actual database query or any other transaction that might be carried out with the database including database entries in the case of creditors and loyalty point providers as required to carry out the authorized transactions. If a query is not received at 435, the background application waits until a query is received at which point control passes to 440 where the query is verified against the profile to assure compliance with the users defined privileges for the third party. If the profile is not verified at 445, the query is rejected at 450 and control returns to 435 to await the next query. In rejecting the query, any number of steps can be taken as will occur to those skilled in the art. Such steps might include logging the attempted query or sending a rejection message to the source of the query. In the event the query is verified at 445, the query is processed within the profile limits at 460 before returning control to 435.

Processing the query at 460 might include carrying out an online transaction as in the case of permitting a creditor to make a charge against a credit card or may permit a loyalty point provider to examine the database and make entries in the database to signify purchases that qualify for loyalty points. Other variations will occur to those skilled in the art.

Figure 5:
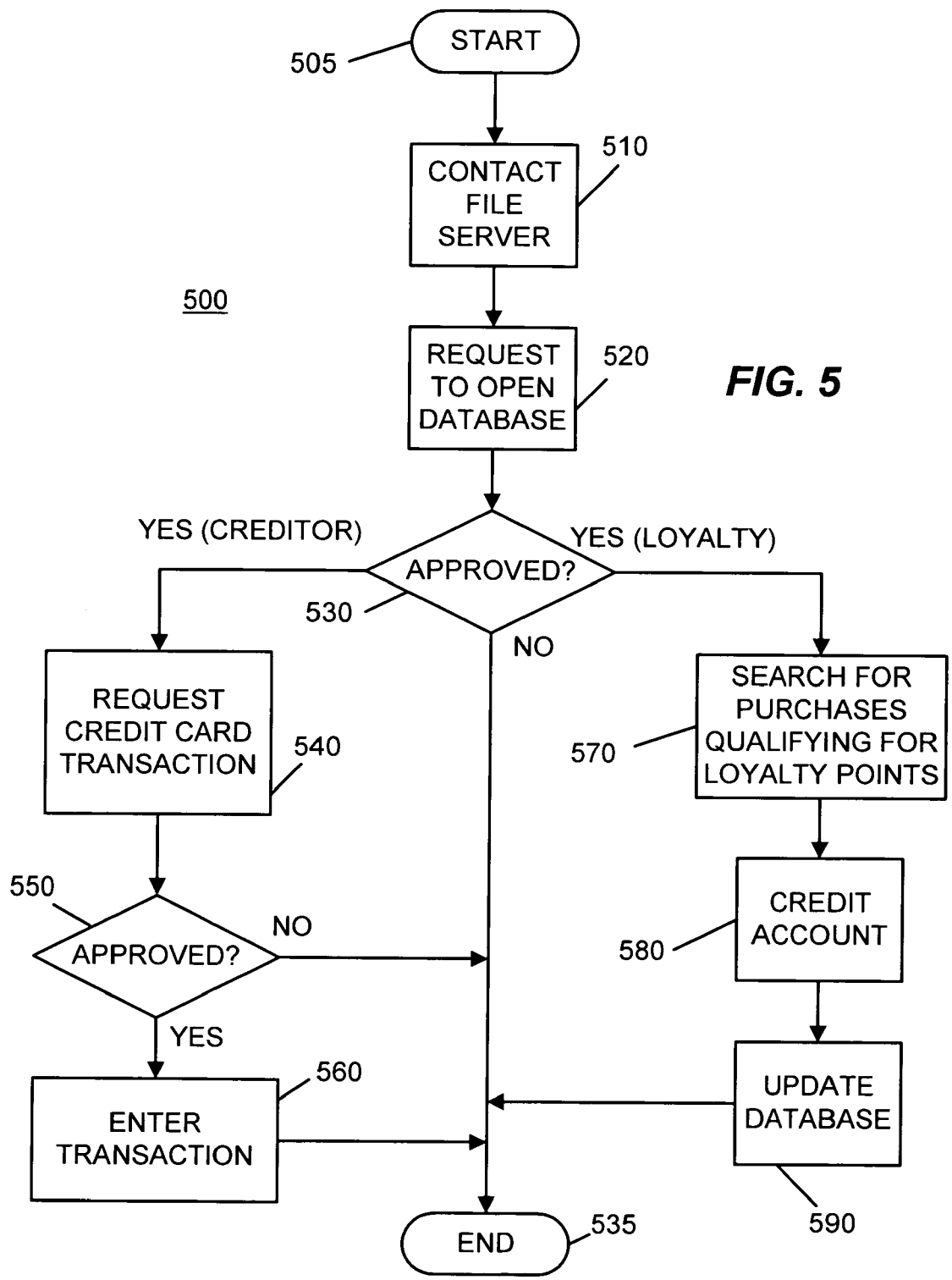
FIG. 5 is a flow chart describing another exemplary embodiment of a process for carrying out a loyalty point or creditor transaction consistent with the present invention.

Referring now to FIG. 5, the process used by a third party (either creditor or loyalty point provider) to access the database is illustrated as process 500. Process 500 is broken into two parts that share a number of similar steps and therefore is being shown in a single flow chart. The process starts at 505. At 510 the third party contacts the file server 320 via the Internet and communication link 335. The third party then transmits a request to open the database at 520. Starting at 530, the process takes the path to the left for the creditor and the path to the right for a loyalty point provider. In the case of the creditor, if the request is not approved the process ends at 535. If, on the other hand, the request to open the database at 520 is approved at 530 for a creditor, control passes to 540 where a credit card transaction is requested (such as a monthly payment of a fixed amount of money.) If the transaction is approved at 550, the transaction is then entered into the database and a transaction with the credit card company is approved for the credit card transaction. In the event the transaction is not approved at 550, the process again ends at 535.

In the event the request at 520 is from a loyalty point provider, and is approved at 530, the process on the right side of the flow chart of FIG. 5 is carried out. The loyalty point provider carries out a search of the database at 570 to identify purchases which qualify for loyalty points. At 580 the loyalty point provider credits the users account with the points identified and at 590 the users database is updated before the process ends at 535. Once the loyalty point provider has access to the consumer's database, marketing efforts can be made more effective by use of consumer profiles to better target consumer's interests.

Figure 6:
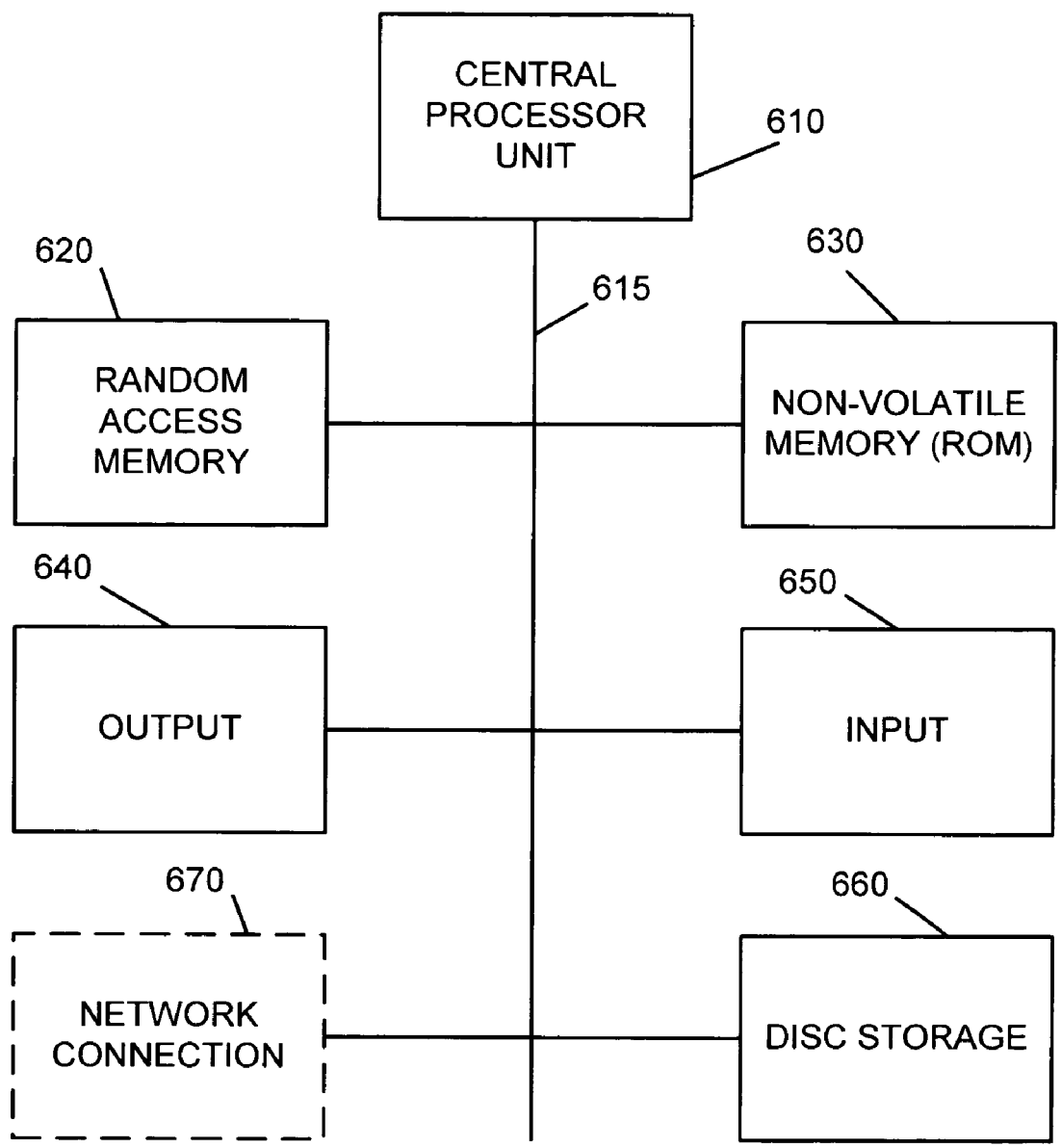
FIG. 6 is a block diagram showing an exemplary computer arrangement suitable for carrying out certain processes consistent with the present invention.

The processes described can be carried out with any device having access to the Internet for carrying out transactions provided it has access to an appropriate storage medium for storing the database. In general, any computer system such as system 600 of FIG. 6 can be utilized for implementing the present invention. Such systems may be embodied in a personal computer, a personal digital assistant, a cellular telephone, a network appliance or other Internet enabled devices. System 600 includes a central processing unit 610 connected via a communication bus 615 to Random Access Memory 620 as well as non-volatile memory 630. An output mechanism such as a CRT or flat panel video screen as well as a LCD display can be utilized in the setup and transaction process. An input device 650 such as a keyboard, mouse, touch pad, stylus system, etc. can be utilized to input data. A storage device 660 either remote or directly connected to bus 615 can be utilized to store the database. In a network enabled system, a network connection 670 is provided; otherwise, another mechanism for connection to the Internet is provided. Those skilled in the art will recognize that system 600 is a very general description of any programmed processor device suitable for carrying out the process of the present invention. Many variations will occur to those skilled in the art.

While the present invention has been described specifically in terms of credit card transactions, with minor modifications, the present invention can also be utilized to deal with transactions with a checking account or other bank saving and loan, brokerage house or other type of account. Moreover, many variations in the present invention will occur to those skilled in the art such as incorporation of features to permit limitations on credit card use such that when limits are exceeded or met, the background application interrupts the transaction in some manner such as supplying an established void credit card number or prohibiting the transaction in any other known way.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented and stored using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices that store the database and program instructions should be considered equivalents.

The present invention is preferably implemented using a programmed processor executing programming instructions that are broadly described above in flow chart form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A computer-implemented method of tracking online credit card usage by a user of a general purpose personal computing device operating as an Internet communication device, comprising:

monitoring entries made on personal computing device using a computer program that operates as a background process running on the personal computing device while a foreground process is also carried out on the personal computing device;

wherein the foreground process comprises an Internet communication process in which an online credit card transaction is being carried out by entry of information into a web page;

the computer program recognizing instances of the credit card transaction in the entries made on the personal computing device by recognition of a credit card number in the entries made into the web page; and upon recognizing an instance of a credit card transaction and receiving verification of the instance of the credit card transaction, the background process automatically populating the web page with data stored in a user profile, and storing information describing the credit card transaction in a database accessible and controlled by the personal computing device.

2. The method of claim 1, further comprising retrieving the information describing the credit card transaction from the database via the personal computing device.

3. The method of claim 1, wherein the recognizing comprises matching an entry with a stored sixteen digit credit card number.

4. The method of claim 1, wherein the personal computing device comprises one of a personal computer, a personal digital assistant a television set top box, a wireless telephone and an Internet appliance.

5. The method of claim 1, wherein the information describing the credit card transaction comprises a monetary amount spent.

6. The method of claim 1, wherein the information describing the credit card transaction comprises a date and time of the transaction.

7. The method of claim 1, wherein the information describing the credit card transaction comprises a merchant name with which the transaction was carried out.

8. The method of claim 1, wherein the information describing the credit card transaction comprises a user identifier.

9. The method of claim 1, wherein the information describing the credit card transaction comprises a monetary amount spent, a date and time of the transaction, and a merchant name with which the transaction was carried out.

10. The method of claim 1, further comprising carrying out a database function on the database.

11. The method of claim 10, wherein the database function comprises totaling a monetary value of a plurality of transactions.

12. The method of claim 1, further comprising
upon recognizing an instance of a credit card transaction, asking a user to verify the information describing the credit card transaction and confirm storage of information describing the credit card transaction prior to storing the information describing the credit card transaction in the database.

13. The method of claim 1, wherein the database is stored within the personal computing device.

14. The method of claim 1, wherein the database is stored in a location remote to the personal computing device.

15. The method of claim 1, further comprising granting access to the database to a creditor; permitting the creditor to charge a monetary value as a credit card transaction; and permitting the creditor to enter the credit card transaction into the database.

16. A computer system, comprising:
a processor having a central processing unit, an input device and memory,
a storage device coupled to the processor, that stores a database accessible and controlled by the processor;
the processor being programmed to perform the programmed steps of tracking online credit card usage by a user of the computer system in a background process carried out by the processor while a foreground process is also carried out by the processor, wherein the foreground process comprises an Internet communication process in which an online credit card transaction is being carried out by entry of information into a web page, the programmed steps comprising the steps of:
monitoring entries made by a user using the input device;
recognizing instances of a credit card transaction in the entries made by the user by recognition of a credit card number in the entries made into the web page; and
upon recognizing an instance of a credit card transaction and receiving verification of the instance of the credit card transaction, the background process automatically populating the web page with data stored in a user profile, and storing information describing the credit card transaction in the database.

17. The computer system of claim 16, further comprising a display for displaying the database upon receipt of a user command.

18. The computer system of claim 16, wherein the recognizing comprises matching an entry with a stored sixteen digit credit card number.

19. The computer system of claim 16, wherein the computer system is embodied in one of a personal computer, a personal digital assistant, a television set top box, a wireless telephone and an Internet appliance.

20. The computer system of claim 16, wherein the information describing the credit card transaction comprises at least one of a monetary amount spent, a date and time of the transaction, a merchant name with which the transaction was carried out, a description of the purchase, and a user identifier.

21. The computer system of claim 16, further comprising means for carrying out a database function on the database.

22. The computer system of claim 21, wherein the database function comprises totaling a monetary value of a plurality of transactions.

23. The computer system of claim 16, wherein the processor is further programmed to carry out the step of, upon the background process recognizing an instance of a credit card transaction, asking a user to confirm storage of information describing the credit card transaction prior to storing the information describing the credit card transaction in the database.

24. The computer system of claim 16, wherein the storage device is situated within the computer system.

25. The computer system of claim 16, wherein the storage device is situated in a location remote to the computer system.

26. The computer system of claim 16, wherein the storage device is connected to a network file server.

27. The computer system of claim 26, further comprising program means for permitting access to the database by a creditor so that the creditor can initiate credit card transactions.

28. A computer-implemented method of tracking online credit card usage by a user of a personal computing device operating as an Internet communication device, comprising:
    monitoring entries made on the personal computing device in a computer program carrying out a background process while a foreground process is also carried out on the personal computer device, wherein the foreground process comprises an Internet communication process in which an online credit card transaction is being carried out by entry of information into a web page;
    the computer program recognizing instances of a credit card transaction in the entries made on the personal computing device by matching an entry with a stored sixteen digit credit card number entered into the web page; and
    upon recognizing an instance of a credit card transaction and receiving verification of the instance of the credit card transaction, the background process automatically populating the web page with data stored in a user profile, and asking a user to confirm storage of information describing the credit card transaction;
    if the user confirms storage of the information, storing information describing the credit card transaction in a database within the personal computing device and accessible and controlled by the personal computing device, the information describing the credit card transaction comprising a monetary amount spent, a date and time of the transaction, a merchant name with which the transaction was carried out, a description of the purchase, and a user identifier;
    retrieving the information describing the credit card transaction from the database via the personal computing device;
    carrying out a database function on the database, the database function comprising totaling a monetary value of a plurality of transactions; and
    wherein the personal computing device comprises one of a personal computer, a personal digital assistant, a television set top box, a wireless telephone and an Internet appliance.

29. A storage medium storing a set of computer instructions which, when executed on a personal computing device, carry out a background process while a foreground process is also carried out on the personal computing device, wherein the foreground process comprises an Internet communication process in which an online credit card transaction is being carried out by entry of information into a web page comprising:
    monitoring entries made by a user using an input device;
    recognizing instances of a credit card transaction in the entries made by the user by recognizing a credit card number in the entries made into the web page; and
    upon recognizing an instance of a credit card transaction and receiving verification of the instance of the credit card transaction, the background process automatically populating the web page with data stored in a user profile, and storing information describing the credit card transaction in a database accessible and controlled by the personal computing device.

30. The storage medium of claim 29, wherein the information describing the credit card transaction comprises at least one of: a monetary amount spent, a date and time of the transaction, a merchant name with which the transaction was carried out, a description of the purchase, and a user identifier.

31. The storage medium of claim 29, the background process further comprises carrying out a database function on the database.

32. The storage medium of claim 31, wherein the database function comprises totaling a monetary value of a plurality of transactions.

33. The storage medium of claim 31, wherein the background process further comprises, upon recognizing an instance of a credit card transaction, asking a user to confirm storage of information describing the credit card transaction prior to storing the information describing the credit card transaction in the database.

34. The storage medium of claim 31, wherein the background process further comprises permitting access to the database by a creditor so that the creditor can initiate credit card transactions.

* * * * *